(No Model.) 5 Sheets—Sheet 1.
J. FOWLEY.
MACHINE FOR MAKING HOOPS, HANDLES, AND CARRIAGE MATERIAL.
No. 568,671. Patented Sept. 29, 1896.
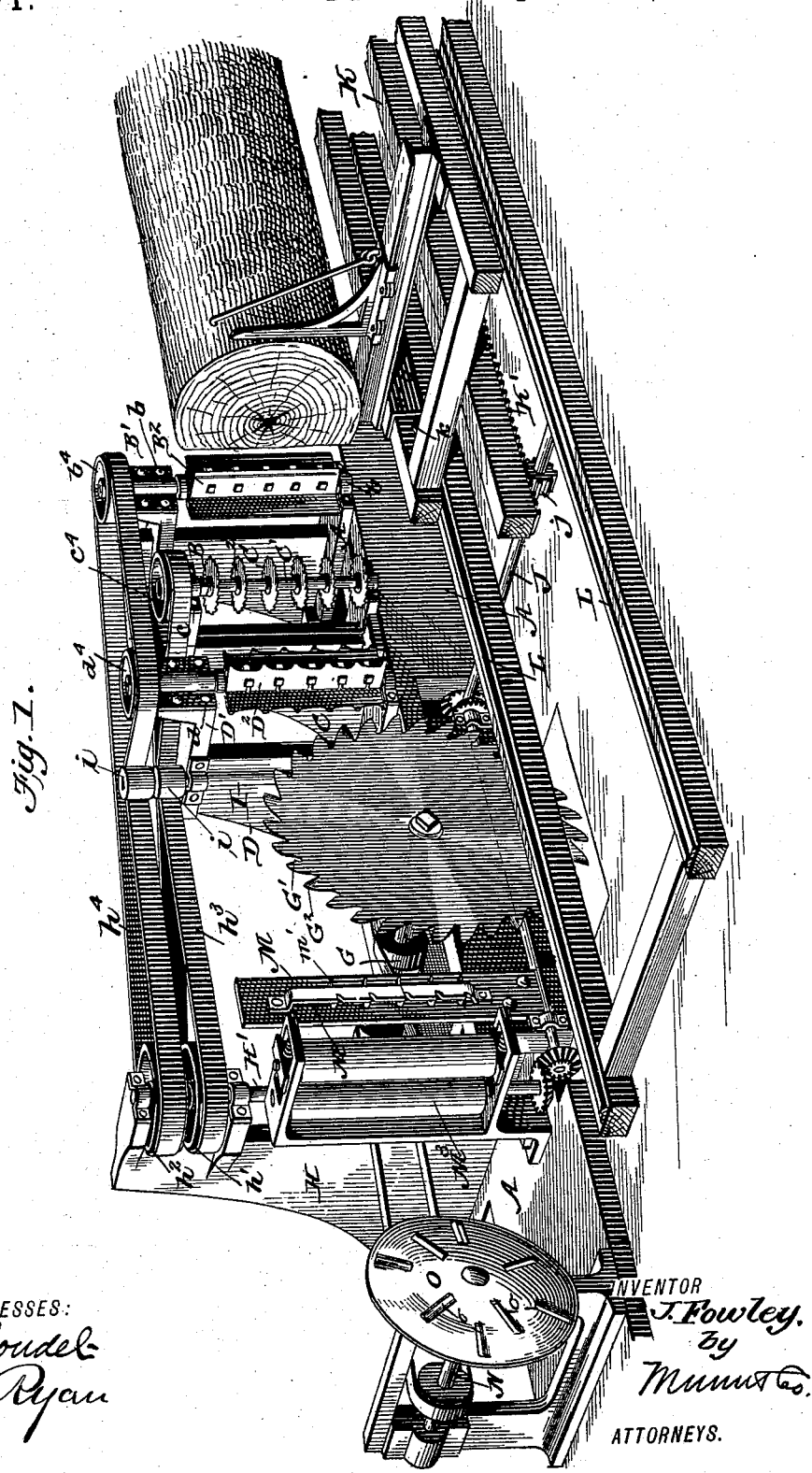
Fig. I.
WITNESSES:
INVENTOR
J. Fowley.
By
ATTORNEYS.

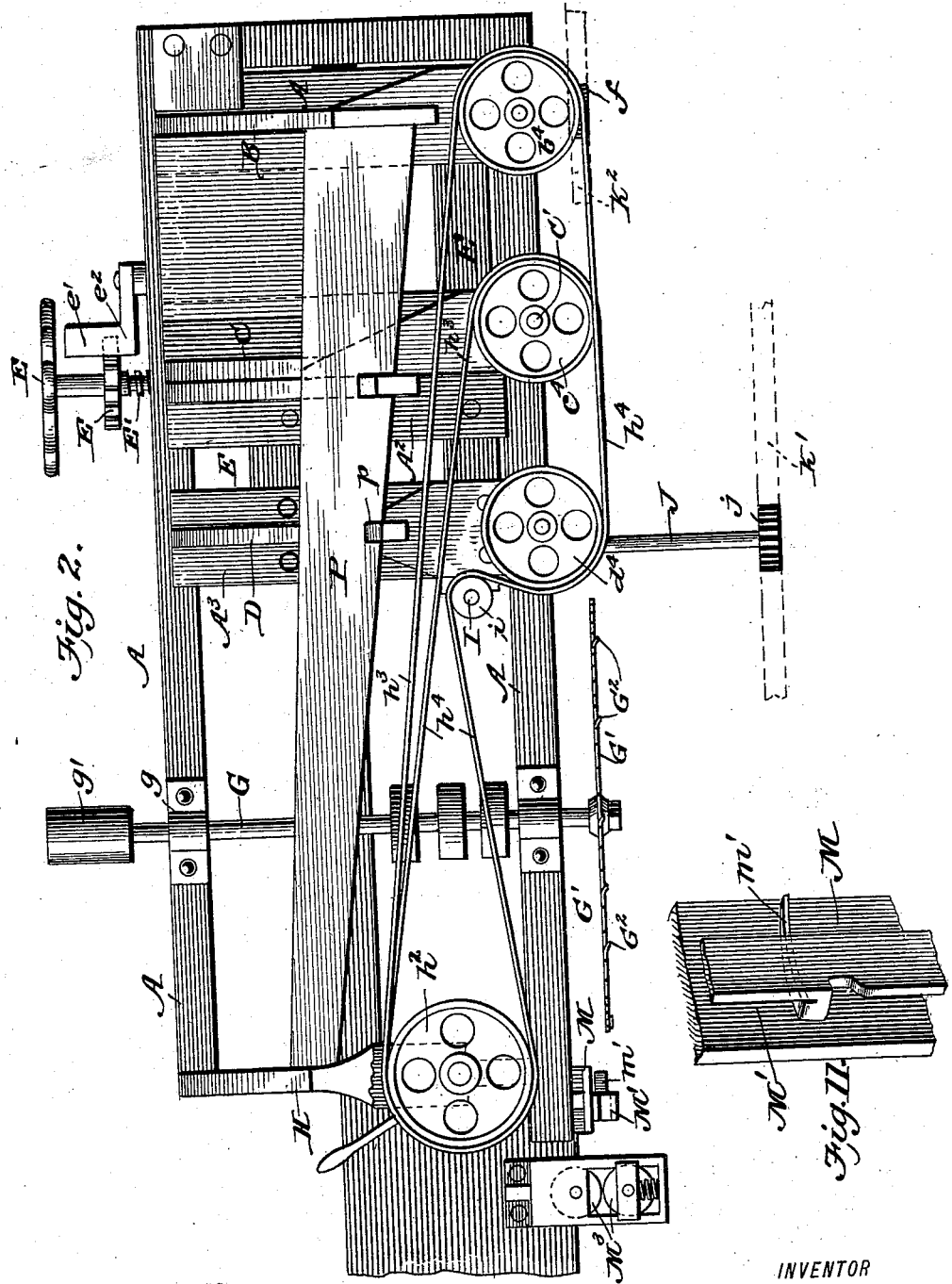

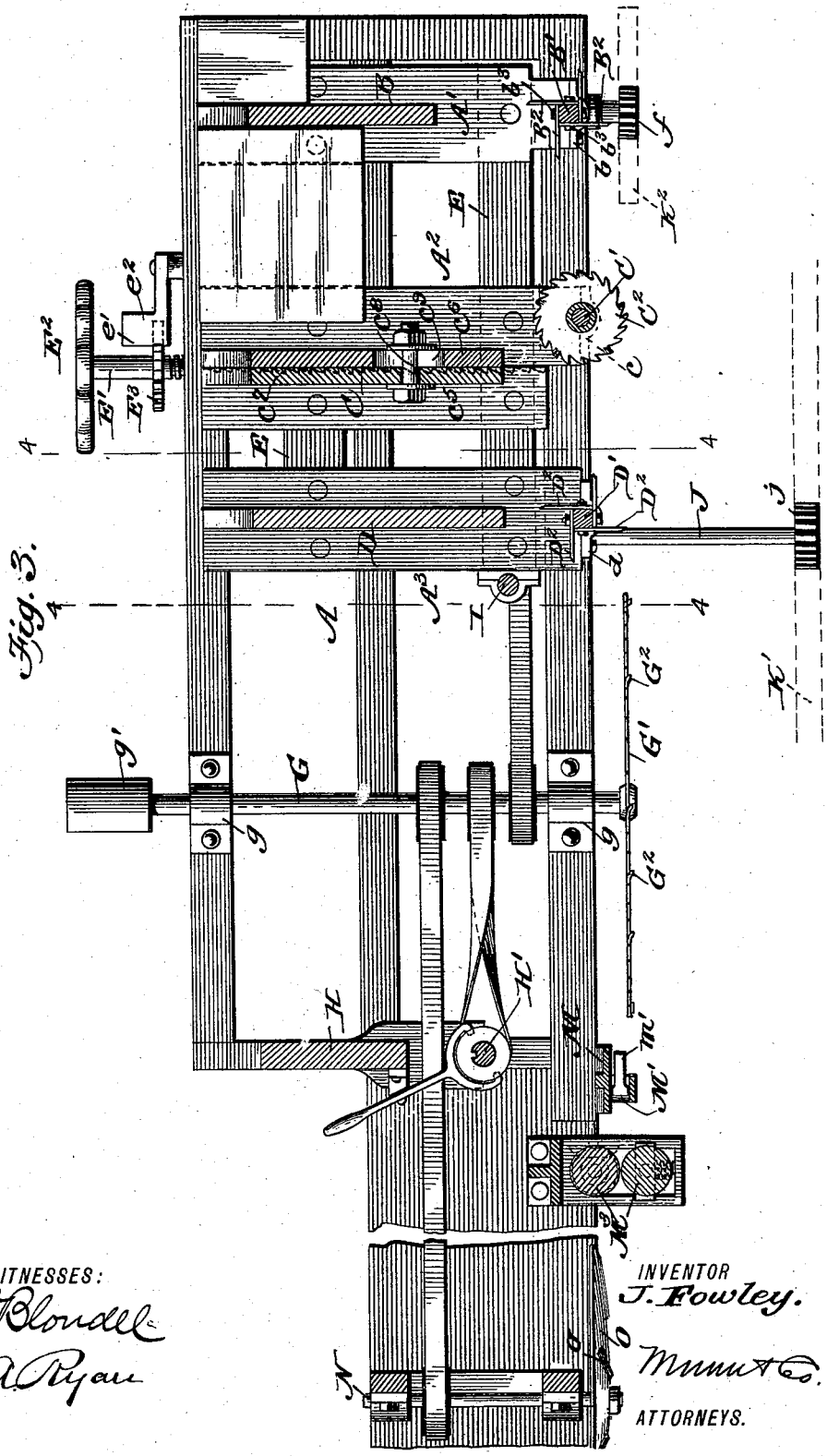

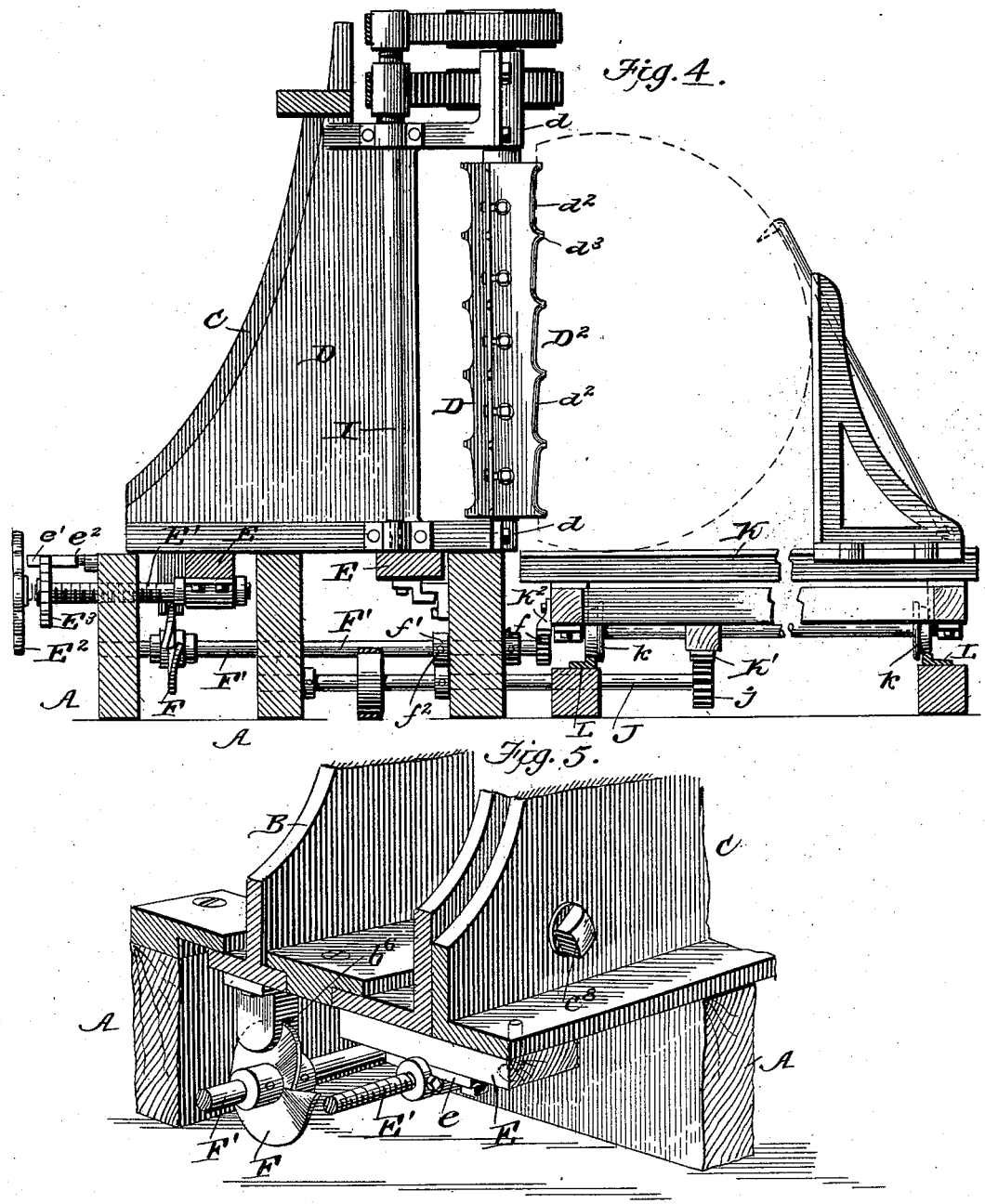

(No Model.) 5 Sheets—Sheet 5.
J. FOWLEY.
MACHINE FOR MAKING HOOPS, HANDLES, AND CARRIAGE MATERIAL.
No. 568,671. Patented Sept. 29, 1896.
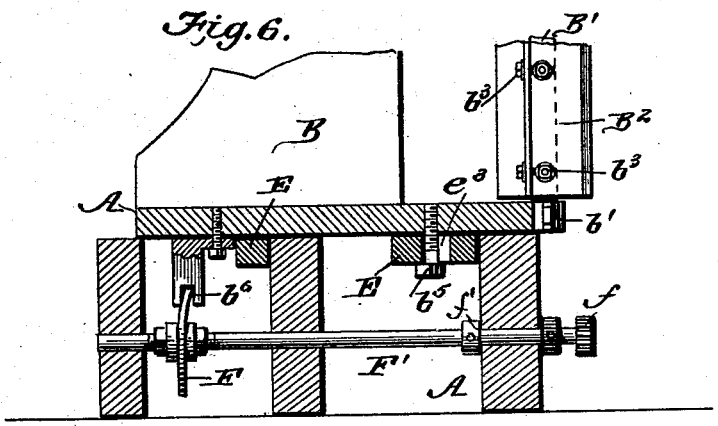
Fig. 6.
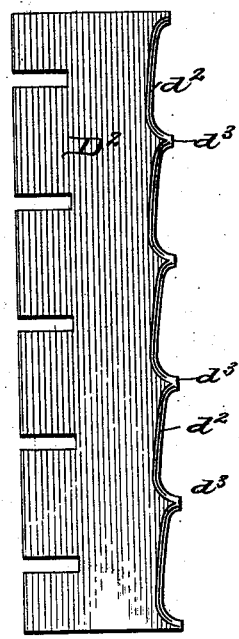
Fig. 7.
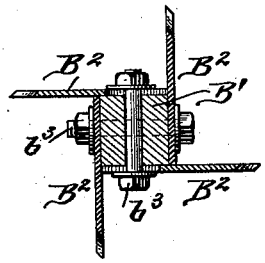
Fig. 9.
Fig. 8.
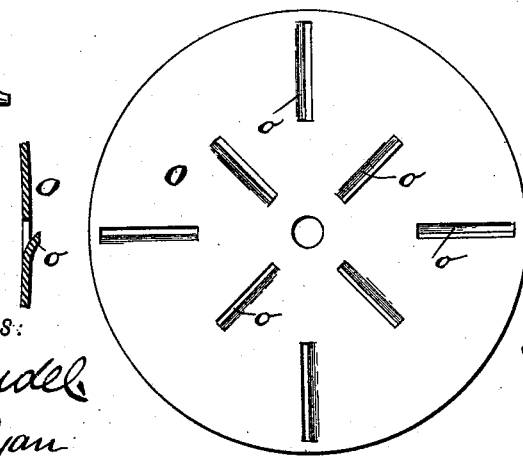
Fig. 10.
WITNESSES:
M. A. Blondel
J. A. Ryan
INVENTOR
J. Fowley.
BY Munn & Co
ATTORNEYS.

UNITED STATES PATENT OFFICE.

JAMES FOWLEY, OF COBDEN, ILLINOIS.

MACHINE FOR MAKING HOOPS, HANDLES, AND CARRIAGE MATERIAL.

SPECIFICATION forming part of Letters Patent No. 568,671, dated September 29, 1896.

Application filed March 21, 1896. Serial No. 584,265. (No model.)

*To all whom it may concern:*

Be it known that I, JAMES FOWLEY, a citizen of the United States, residing at Cobden, in the county of Union and State of Illinois, have invented certain new and useful Improvements in Machines for Making Hoops, Handles, and Carriage Material, of which the following is a full, clear, and exact description, reference being had to the accompanying drawings, in which—

Figure 1 is a perspective of the machine, the carriage being broken away. Fig. 2 is a plan view of the machine with the carriage removed. Fig. 3 is a horizontal section through same. Fig. 4 is a vertical cross-section on line 4 4, Fig. 3, the carriage being in place. Fig. 5 is a detail perspective of the lap-planer feed mechanism. Fig. 6 is a detail cross-section to further illustrate said feed mechanism. Fig. 7 is a side elevation of one of the shaping-planer bits. Fig. 8 is a similar view of a lap-planer bit or cutter. Fig. 9 is a transverse section through the shaping-planer head. Fig. 10 is a side elevation and detail section of the pointing-cutter head. Fig. 11 is a detail perspective of one of the spring-guides.

My invention relates to a combination woodworking-machine.

The object of the invention is to provide a machine capable of forming hoops and other articles directly from the logs or saplings without having to first saw the logs in one machine and then treat the material in several other machines.

A further object is to so construct the machine that the logs may be flitched or cut up longitudinally by a combined saw and planer after having first moved the first two planer-heads and gang-saws back out of operative position; also to provide a machine which will not only cut and shape the hoops, but which will also plane them by means of planer teeth or bits carried by the gang and main saws.

The further objects will be brought out in the specification.

The invention will be hereinafter fully described and claimed.

A represents a suitable bed or main frame having three transverse guideways $A'$ $A^2$ $A^3$, Fig. 3, across its upper side, in which are mounted to slide the lower ends of the three standards B C D, the front edges of which are provided with upper and lower bearings $b$ $c$ $d$, respectively, (see Figs. 1 and 4,) in which are journaled the shafts $B'$ $C'$ $D'$. The right-hand shaft $B'$ is provided with four longitudinally-extending outwardly-projecting straight-edge planer bits or blades $B^2$ $B^2$, Figs. 1, 8, and 9, having slots $b^2$ and securing-bolts $b^3$, and the planer-head thus formed I term, for convenience, the "lap-planer." The middle shaft $C'$ is provided with a gang of circular saws $C^2$, some of the teeth of which are bent laterally to form planer-bits, so that the saws will plane the material as it saws therethrough. This gang-saw and planer will be referred to as a "gang kerfing and planing" saw. The inner shaft $D'$, Fig. 3, is provided with four shaping-planer bits $B^2$, Figs. 4 and 7, to give the rounding shape to the sides of the material being treated. These bits are provided with concave cutting edges $d^2$ and end and middle tongues $d^3$. These tongues $d^3$ are in horizontal alinement with the respective kerfing-saws $C^2$, and the concave cutting edges are in line with the spaces between the kerfing-saws. The three above-described shafts are provided with drive-pulleys $b^4$ $c^4$ $d^4$ on their upper ends, the pulley $c^4$ being in a lower plane than the other two.

The standards C D are rigidly connected within the base or bed A by means of transverse bars E, Fig. 3, and the rear bar E is provided with a bracket $e$, Fig. 5, in which the inner end of an adjusting-screw $E'$ is swiveled. This screw $E'$ passes through the rear one of the longitudinal bars or sills of the main frame, Fig. 4, and through a screw-threaded aperture in the same, and is provided at its outer end with an operating handle or wheel $E^2$ and with a ratchet-wheel $E^3$, Figs. 2, 3, and 4, with which engages the elongated tooth $e'$ of a pawl $e^2$, pivoted to the frame. By turning the wheel $E^2$ to the right the screw will be forced inward and the transverse bars E with standards B C D will be moved toward the front side of the machine to bring the lap-planer, kerfing-saws, and shaping-cutter head into operative position, and vice versa. One of the bars E extends under the standard B and is transversely slotted, as at $e^3$, Fig. 6, to receive a pin $b^5$, projecting down from the base of said standard. The rear end of the lower face of the base of said standard B is provided with a transverse slot $b^6$, into which projects the upper edge of a cam-wheel F, Figs. 5 and 6, mounted on a transverse shaft F′, journaled in the base and provided beyond the front side thereof with a pinion $f$. A collar $f'$, Fig. 4, is mounted on the shaft F′ adjacent to the inner side of the front of the base A, and is provided with a set-screw or pin $f^2$, by which it may be held fast to the shaft or loosened thereon. When the collar $f'$ is held fast, the shaft F′ will be held against longitudinal movement, so that when rotated back and forth it will cause the lap-planer B² to be moved in and out with its standard B, the pin-and-slot connection $b^5 e^2$, Fig. 6, allowing the standard B to move in and out independent of the standards C D; but when all three standards are to be drawn back or held out of operative position the screw E′ will be turned to the left to bring back bars E E, and when pin $b^5$, Fig. 6, is acted on by the front end of slot $e^3$ the standard will also be held back or prevented from moving forwardly, the sleeve or collar $f'$ being at this time loosened on the shaft F′, so that its cam F will not be able to force the standard B outwardly.

In order that the standard C may have an independent adjustment from that given it by the adjusting-screw E′ for the purpose of adjusting the saw-shaft C′ outwardly as the saws wear down, I form this standard C in two sections placed face to face, (see Fig. 3,) the section $c^6$ carrying the shaft C′ and connected to the section $c^5$ by interlocking upper and lower ratchet-teeth $c^7$ and transverse bolts $c^8$, which pass through holes in section $c^5$ and slots $c^9$ in the section $c^6$. By loosening the bolts and moving the section $c^6$ outwardly or toward the saw-table and then tightening the bolts the proper adjustment may be given the kerfing-saws C².

G, Figs. 2 and 3, is the main driving-shaft, journaled beyond the shaping-cutter head D² in bearings $g\ g$ on the base A, and provided with a power-pulley $g'$ on its rear end and with a combined rip and planer saw G′ on its front end. This saw G′ will cut the log at right angles to the kerfing-saws C², and will be of a diameter to cut through the log at the bases of the kerfs and thus sever the portions between the kerfs, as will be more fully described hereinafter. This saw G′ will also have planer teeth or bits G² at intervals, so that the use of a separate planer will not be necessary. The saw G′ may be a circular or a band saw, as may be desired.

H′, Figs. 1, 2, and 3, is a vertical power-transmitting shaft journaled in bearings in a fixed standard H and belted at its lower end to the drive-shaft G, and provided at its upper end with two pulleys $h'\ h^2$, the lower pulley $h'$, Fig. 1, being belted by belt $h^3$ to the pulley $c^4$ on saw-shaft C′, and the upper pulley $h^2$ being belted by belt $h^4$ to the pulleys $d^4\ b^4$. The outer runs of these belts $h^3\ h^4$ pass behind idle-pulleys $i\ i$, mounted on a vertical axis I, so that as the standards B C D are moved forward the belts will be forced against these pulleys $i\ i$ and tightened thereby.

J, Figs. 1, 2, 3, and 4, is a transverse table-operating shaft mounted in the base and to the right of the shaft G, and provided at its outer end with a pinion $j$. The shaft J is driven in any suitable manner from the shaft G.

K, Figs. 1 and 4, is the saw-table, which may be provided with any suitable log adjusting and turning devices. This table K has wheels $k$, which run on the tracks L, parallel with the front side of the base A, and one of the longitudinal sills of the table is provided with a feed-rack K′, meshing with the pinion $j$, so that the table will be moved back and forth thereby. K², Fig. 4, is a second rack, much shorter than rack K′ and mounted on the under side of the right-hand end of the saw-table, (see dotted lines, Fig. 3,) to mesh with the pinion $f$ on the cam feed-shaft F′ of the standard B, so as to rotate shaft F′ as the table K is fed forward and cause said shaft and its cam F to feed the standard B outward just as the rear end of the log reaches the lap-cutter head B², so as to bevel that portion of the log which will form one end of the hoops. Then as the table is retracted the rack K² will reverse the movement of the shaft F′ and cam F, which will cause standard B to be retracted and withdraw its planer-head B².

M, Figs. 1, 2, and 3, is a vertical guide-casing beyond the rip-saw G′, and it has as many guideways M′ as there are gang-saws C², the bottom of these guideways M′ being formed of the plate-springs $m'$. (See Fig. 11.)

M³ M³, Figs. 1, 2, and 3, represent a pair of drawing-rolls mounted in a framework adjacent to the guide M, one roll being fixed to a vertical shaft driven through suitable bevel-gears and a horizontal shaft from the shaft J, as seen in Fig. 1. The other roll is mounted in spring-seated bearings, as seen in Figs. 1, 2, and 3, so as to allow of a yielding movement for hoops of different thicknesses.

As the log is fed forward by the table the strips or hoops severed will enter the guideways M′, which will support them when fully severed. Beyond the guide M about the length of a hoop is mounted a transverse shaft N, belted to the drive-shaft G.

O is a circular pointing-cutter head formed of a concavo-convex disk of sheet metal, the convex face being the working face. From this disk a series of radial cutter-bits $o$ are punched up, as clearly shown in Fig. 10 of the drawings.

The operation is as follows: The saw-table is retracted and a log placed thereon, the three standards B C D all being retracted. When everything is ready, the wheel E² is turned so that the screw E′ will feed the standards B C D forwardly to bring their bits and saws into operative position. As the saw-table moves to the left that end of the log will first be presented to the kerfing and planer saws C², which will cut a series of longitudinal kerfs and plane the walls thereof, the depth of the kerfs being regulated to correspond to the thickness of the hoops or strips desired. Then the log is brought along to the shaper-head, the bits of which shape the portions between the kerfs to agree with the shape of the bits. Then the end of the log reaches the rip and planer saw G', which severs all of the hoops or strips, the end of which will now pass into the guides and between the two rolls M³, and as the table moves forward the strips will be removed by a boy, who will point them on the cutter-head O. Just as the rear portion of the log comes opposite to the lap-cutter the rack K² will cause the cam-shaft to feed the standard B outward and bring the cutters or bits against the log to bevel the log and form the lap for that end of the series of hoops.

Any short strips caused by breaking of the long strips or hoops owing to knots or other imperfections, may be afterward pointed and lapped by the workman upon the cutter-head O for use on half-barrels, kegs, &c., so that nothing will be lost.

If it is desired simply to flitch up a log into cross-ties, bridge-timbers, &c., then the three standards B C D and parts carried thereby will be retracted out of the way and the combined saw-planer G' only will be used.

It will be seen that not only hoops, but material for handles and for carriage and wagon makers' and carpenters' use may be formed on this machine. There will be no ragged edges or faces on the hoops or strips, as both the saw G' and saws C² are provided with planer-bits, and hence the material will last much longer than if merely sawed.

P, Fig. 2, is a horizontal brace bolted to the upper end of the standard C with its ends bearing against the inner sides of the upper ends of the standards B and H, but not positively connected thereto. The brace P is provided with a slot *p* to receive the upper end of the standard D. Thus the upper ends of the standards will be braced apart against the strain of the driving-belts, and yet allow the movable standards to be moved in and out.

The kerfing-saws may be spaced apart any desired distance on their shaft by suitable washers, and the shaping cutters or bits may be made in patterns to suit the adjustment of the kerfing-saws, so that hoops or pieces of any desired widths may be worked out by removing and changing the shaping-cutters and properly spacing the kerfing-saws.

Having thus described my invention, what I claim as new, and desire to secure by Letters Patent, is—

1. The combination with the main frame or base, and the saw-table; of the gang of horizontal kerfing-saws arranged about a vertical axis, a shaping-cutter head arranged in rear of the kerfing-saws about a separate vertical axis, and means for adjusting said kerfing-saws and shaping-cutter heads at right angles to their axis independently of each other to vary the thickness of hoops, and a vertical rip-saw arranged in rear of the shaping-cutter head to sever the strips at the base of the kerfs substantially as set forth.

2. The combination with the main frame or base, and the saw-table; of the vertical lap-cutter head arranged at the front end of the main frame and upon one side of the log to act upon the log before the strips are severed, mechanism for feeding said lap-cutter head in or out, the gang of horizontal kerfing-saws in rear thereof, the shaping-cutter head in rear of the kerfing-saws, and the vertical main or rip saw in rear of the shaping-cutter head, substantially as and for the purpose described.

3. The combination with the main frame or base, and the saw-table; of the vertical lap-cutter head arranged at the front end of the main frame and upon one side of the log to act upon the log before the strips are severed, means for feeding said lap-cutter head in and out, the gang of combined horizontal kerfing-saws and planers, in rear of the lap-cutter head, the vertical shaping-cutter head in rear of the kerfing-saws to shape the material between the kerfs, and the main combined rip-saw and planer arranged in a vertical plane behind the shaping-cutter head to sever the strips from the log substantially as and for the purpose described.

4. The combination with the main frame or base and the saw-table of the three vertical standards; the inner two of which are connected for simultaneous adjustment toward the saw-table, and the outer one of which has an independent feed mechanism, a vertical lap-planer or cutter-head carried by the last-named standard, a gang of horizontal circular kerfing-saws mounted on the middle standard, a shaping-cutter head mounted on the inner standard, and a vertical rip-saw to sever the strips from the log after it passes the shaping-cutters, substantially as set forth.

5. The combination with the main frame or base and the saw-table having an operating mechanism, of the outer standard having a feed mechanism geared to the saw-table, a lap-cutter mounted on said standard, a middle standard, the kerfing-saws mounted thereon, the inner standard, the shaping-cutter head mounted thereon, a horizontal bar positively connecting the middle and inner standard and having a pin-and-slot connection with said outer standard, a feed-screw for feeding the inner standards in and out, and the main or rip saw for severing the strips after they have passed the shaping-cutter head, substantially as set forth.

6. The combination with the base or frame and the saw-table having an operating mechanism, of the vertical standard carrying a cutter-head, a transverse feed-shaft operatively connected with the lower end of said standard and having a pinion on its outer end and a short rack on the saw-table to mesh with said pinion, substantially as set forth.

7. The combination with the base or frame and the saw-table having a short rack and an operating mechanism, of the vertical standard carrying a cutter-head and provided with a groove in its under side, and a transverse feed-shaft having a cam-wheel entering said groove and a pinion engaging said short rack, substantially as set forth.

8. The combination with the base or main frame and the saw-table, of two transversely-sliding connected standards mounted on the base or frame, a feed-screw mounted in the frame and having a swiveled connection at its inner end with the lower ends of said standards, a gang of kerfing-saws mounted on one standard and a shaping-cutter head mounted on the other standard to shape the material between the kerfs, substantially as set forth.

9. The combination with the base and the saw-table, of the gang of kerfing-saws, arranged about a vertical axis, the vertical rip-saw in rear thereof to sever the material into strips at the bases of the kerfs, a vertical guide arranged beyond and next to the rip-saw and having a vertical series of guideways alining the severed strips, substantially as set forth.

10. The combination with the base and the saw-table, of the vertical lap-cutter head, the gang of kerfing-saws in rear thereof arranged upon a vertical axis, the shaping-cutter head in rear of the said saws also arranged about a vertical axis, the rip-saw in rear of the shaping-cutters, and the vertical guide beyond and next to the rip-saw and having a vertical series of guideways alining the spaces between the kerfing-saws, substantially as set forth.

11. The vertical strip-guide provided with a series of transverse guideways for the strips, and springs forming the bottoms of the guideways, combined with and arranged next to the vertical rip-saw, substantially as set forth.

12. The vertical strip-guide provided with a series of transverse guideways having springs combined with and arranged next to the vertical rip-saw, and guide-rolls adjacent to the guideways, substantially as set forth.

13. The herein-described machine comprising the base or bed, the saw-table, having an operating-shaft and gearing, a short rack at the rear end of the saw-table, a standard at the rear end of the frame and provided with a feed-shaft geared to said short rack, a lap-cutter head journaled in said standard, a middle and inner standard adjustably mounted on the base and carrying a gang of kerfing-saws and a shaping-cutter respectively, a drive-shaft geared to the table-operating shaft, and carrying a rip-saw at its outer end, to sever the shaped strips at the base of the kerfs, a vertical transmitting-shaft having two pulleys, belted to the pulleys of the shafts of said cutter-heads and gang-saw respectively and also belted to the drive-shaft, a guide beyond the rip-saw and a pointer-cutter head beyond the guide and belted to the drive-shaft, substantially as set forth.

14. The combination with base and the end and intermediate adjustable standards, of the horizontal brace connected to the upper end of one of the intermediate standards and slidingly engaging at its ends the two end standards, substantially as set forth.

15. The combination with the base, and the saw-table and its operating mechanism, of the three adjustable standards having vertical shafts carrying the lap, kerfing and shaping tools, pulleys on the upper ends of the shafts, a drive-shaft, a vertical transmitting-shaft having two pulleys belted to said first-named pulleys as described, and idler-pulleys engaging the outer runs of the belts to tighten them when the standards are adjusted outwardly, substantially as set forth.

JAMES FOWLEY.

Witnesses:
ELI MULL,
EDWARD P. HARMON.